United States Patent [19]

Dedole et al.

[11] Patent Number: 4,773,501

[45] Date of Patent: Sep. 27, 1988

[54] DEVICE FOR GENERATING SEISMIC IMPULSES INSIDE A DRILLING THROUGH THE FALL OF A WEIGHT ONTO AN ANCHORED TARGET ELEMENT

[75] Inventors: Pascal Dedole, Rueil Malmaison; Jean Laurent, Orgeval; Yves Ollivier, Lardy, all of France

[73] Assignees: Institut Francais Du Petrole; Companie General De Geophysique, both of Malmaison, France

[21] Appl. No.: 652,647

[22] Filed: Sep. 21, 1984

[30] Foreign Application Priority Data

Sep. 22, 1983 [FR] France .................................. 83 15206

[51] Int. Cl.$^4$ .............................................. G01V 1/40
[52] U.S. Cl. .................................... 181/106; 181/121; 367/911; 175/1
[58] Field of Search ............... 181/121, 113, 106, 401, 181/105; 367/911; 175/1

[56] References Cited

U.S. PATENT DOCUMENTS

| 2,281,751 | 5/1942 | Cloud | 181/106 |
| 2,993,553 | 7/1961 | Howes | 181/121 |
| 3,209,854 | 10/1965 | Williams | 181/121 |
| 3,270,832 | 9/1966 | Williams | 181/121 |
| 3,346,066 | 10/1967 | Miller, Jr. et al. | 181/106 |
| 4,205,731 | 6/1980 | Cholet et al. | 181/121 |
| 4,252,210 | 2/1981 | Sodich | 181/401 |

FOREIGN PATENT DOCUMENTS 0972430 11/1982 U.S.S.R. ............................. 181/113

Primary Examiner—Thomas H. Tarcza
Assistant Examiner—Ian J. Lobo
Attorney, Agent, or Firm—Antonelli, Terry & Wands

[57] ABSTRACT

Device for generating seismic impulses for, for example, seismic prospecting, inside a hole or drilling well by impact of a weight or mass falling onto a target element coupled with a wall of the hole or drilling well. The target element is bound up with a variable volume anchorage element capable of being expanded so that it strikes against the wall of the hole or drilling well and is surmounted by a guiding column along which slides a hammer or weight forming the mass. A cable lifting system and magnetic devices enable the hammer or weight to be hoisted to a particular height above the target element.

4 Claims, 2 Drawing Sheets

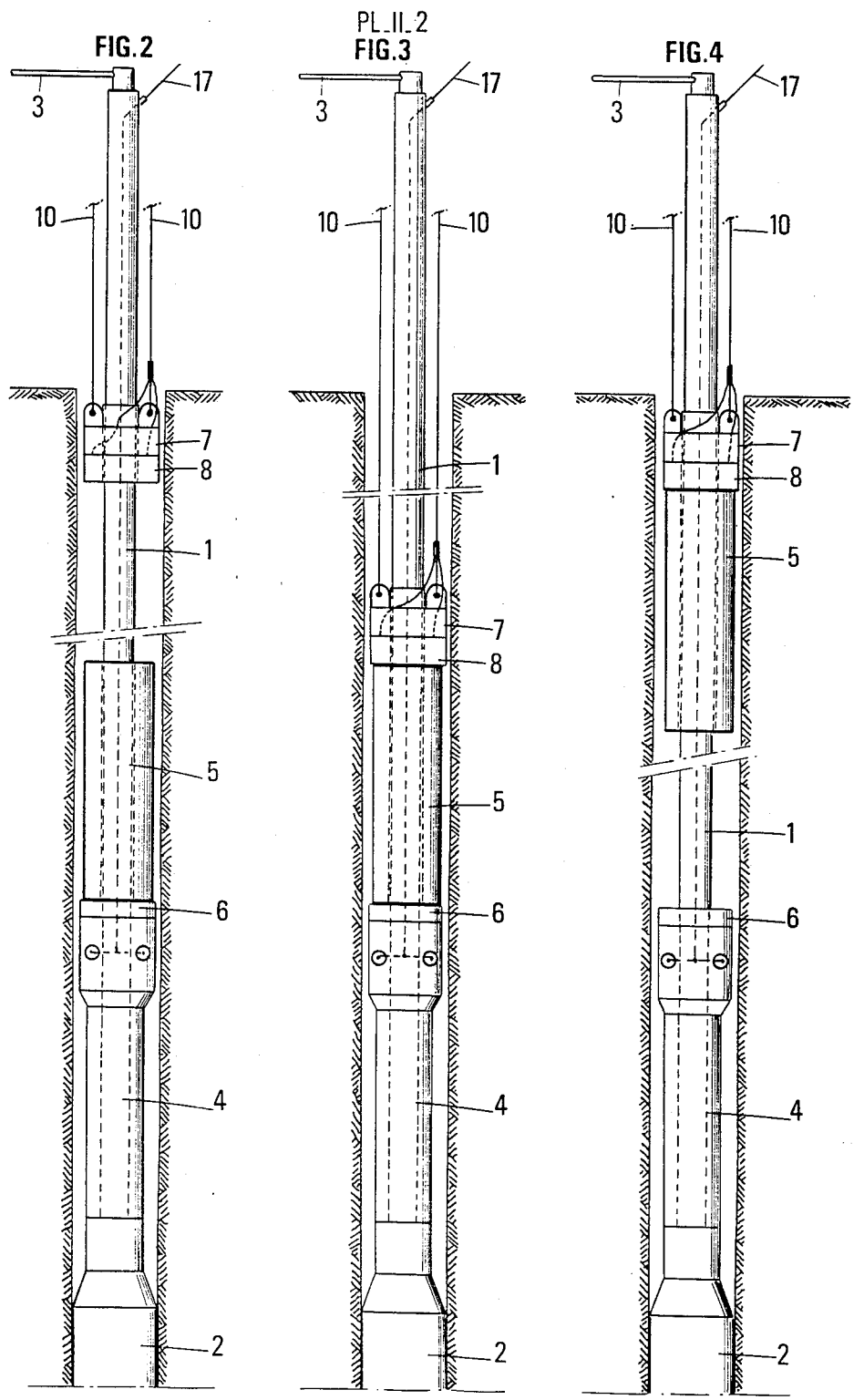

DEVICE FOR GENERATING SEISMIC IMPULSES INSIDE A DRILLING THROUGH THE FALL OF A WEIGHT ONTO AN ANCHORED TARGET ELEMENT

BACKGROUND OF THE INVENTION

The present invention relates to a device for generating seismic impulses inside a hole or well drilled in the earth, and more particularly, to a device for generating impulses through an impact of a weight onto a target element coupled with the wall of the hole or drilling well, especially in the field of terrestial seismic prospecting.

Several devices has been proposed for applying acoustic impulses to the walls of a well, and, for example, a so-called "gas gun" type has been proposed which includes a tubular body equipped with openings communicating with means for intermittently releasing a highly-pressurized gas, which gas may be compressed air or a combustion product of an explosive mixture. The acoustic impulses are transmitted to the walls of the well through water or the sludge contained therein. Devices of this type are described in, for example, French Pat. No. 2,311,322 or the U.S. Pat. No. 3,380,551.

It is also possible, as proposed in U.S. Pat. No. 4,207,961, to generate seismic impulses by a sudden ejection of pressurized water inside a well filled with water.

Of the devices proposed for applying seismic shocks to the walls of a well by means of impacts, such devices may comprise one or several elements, portable with regard to a tubular body lowered into the drilling on the end of a cable and to which pertinent motor devices imparts significant radial accelerations and which then arrive and strike the wall of the well, thus generating impulses which are transmitted to the surrounding formations. These motor devices may, for example, be pistons connected to the portable elements and driven inside combustion chambers by the explosion of explosive mixtures. As proposed, for example, in French Pat. No. 2,492,111.

Moreover, devices have been proposed which include coupling parts connected to a body, which are deflected laterally in relation to the latter in such a way as to strike against or sink into the walls. Portable mobile weights inside the body are connected to pertinent motor devices which impart rapid movements to them. The impact forces when mobile weights collide or strike a solid wall of the body are then mechanically transmitted to the formations traversed by the drilling by the coupling parts in a manner described, for example, in French Pat. No. 2,442,455.

Drawbacks or disadvantages of the above-mentioned types of impact devices reside in the fact that the shocks, applied to geological formations traversed by the well have a fairly low amplitude since the mobile parts are relatively small and light and have a relatively short travel path or the motor devices which can be accommodated inside a cylindrical body, very frequently of short diameter, generally have a limited output power.

According to the invention, the device for generating acoustic impulses inside a well or drilling hole includes a target element, a weight for striking the target element, means for guiding the fall of the weight onto the target element and a lifting system for raising the weight in relation to the target element. A coupling element is provided which includes a variable volume enclosure adapted to be applied by volume expansion against the side wall, with the target element being fixed to the coupling element, and means are also provided for intermittently inflating the enclosure, with the inflation means including, for example, a hydraulic circuit and a pressurized water supply system.

The present invention offers the advantage that the sound energy generated at the moment of impact is considerable due to the fact that the height of the column rising above the target element, and, consequently, the kinetic energy capable of being applied to this element, may be very considerable also. This sound energy is particularly effectively transmitted to the surrounding formations due to the tight coupling existing between the inflatable enclosure supporting the target element and the walls of the well.

Moreover, with sound energy applied to the earth at a certain depth, preferably beneath the surface bed or altered bed, it is possible to avoid multiple reflections over this bed of seismic waves which disturb the recordings made from surface seismic sources.

Other characteristics and advantages of the device according to the invention will appear upon reading the description of a preferred yet non-restrictive realization mode and by referring to the attached drawings.

BRIEF DESCRIPTION OF THE DRAWINGS

FIG. 2 is a schematic view of the device, with a weight thereof being in a lowered position in contact with the target element, FIG. 3 is a schematic view of the device, with a lifting system thereof being lowered as far as the target element, and FIG. 4 is a schematic view of the device, with the weight being brought into a raised position and held up by the lifting system.

DETAILED DESCRIPTION

Figure 1:
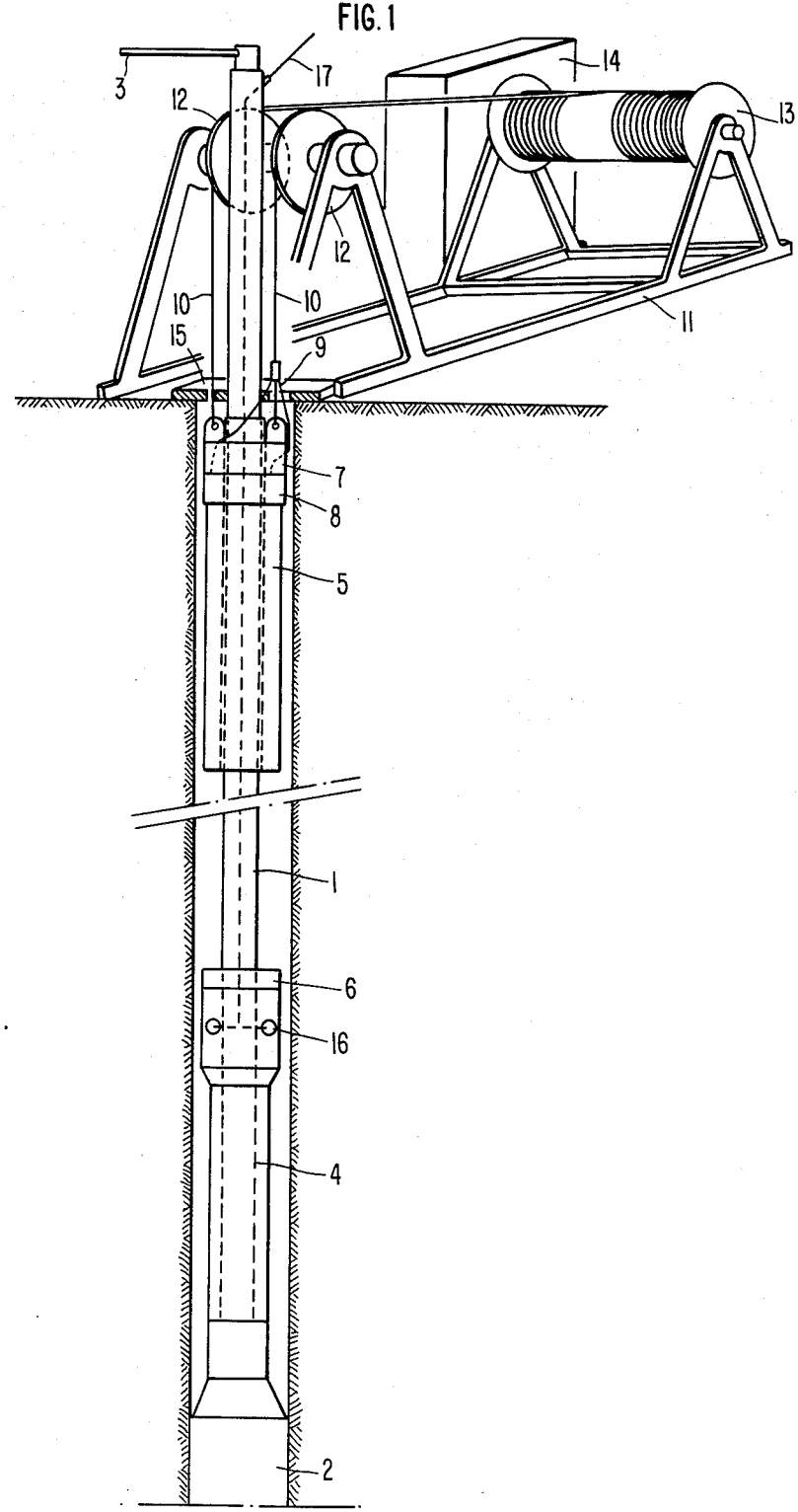
FIG. 1 is a schematic view of a device constructed in accordance with the present invention installed inside a well and linked to motor devices disposed on the surface.

Referring now to the drawings wherein like reference numerals are used throughout the various views to designate like parts and, more particularly, to FIG. 1, a device for generating seismic impulses inside a well or drilling hole through a fall of a weight onto an anchored target includes a tubular guiding column 1 bound up at its lower part with a coupling element 2 enabling the base of the guiding column 1 to be anchored against the wall of a well at a selected depth level. The coupling element in this instance is a borehole blow-out preventer (B.O.P.) communicating through the interior of the guiding column 1 and through a pipe 3 which is connected to it with pressurized water supply means (not shown). A target element 4, having a diameter greater than that of the guiding column 1, is fixed to the lower part of the latter above the blowout preventer 2. A tubular weight or hammer 5 is adapted to slide freely along the guiding column 1 between a raised position, from which its fall is released, and a lowered position where it comes into contact with the upper face of the target element 4. A disk 6 of, for example, a deformable material, is fixed against the upper face of the target element 4 in order to avoid direct impact between the two metallic elements.

The device also includes a lifting system for the weight or hammer 5, with the lifting system including a crown 7 sliding along the guiding column 1 and provided at its base with magnetic devices 8 including permanent magnets, a magnetization of which can be suppressed by an intermittent application of an electric demagnetization current. This current is applied to the magnets by electric conductors 9 connected to traction cables 10 fixed to the upper part of the crown 7. The traction cables 10 are connected to a surface lifting system comprising a frame 11 supporting return pulleys 12 and a winch 13 connected to motor devices 14 constituting a motor coupled to a reducer. The traction cables 10 bear on the return pulleys 12 and wind over the winch 13. A centering plate 15 is disposed, for example, at the well opening in order to maintain the guiding column 1 within the axis of the latter and to facilitate the free sliding of the weight or hammer 5 between its raised position and its lowered position.

The device may also include shock detector devices arranged inside of pertinent receptacles of the target element 4. These devices made up, for example, of reed relays are connected to a control and recording system (not shown) established on the surface by electric conductors 17 passing inside the central conduit of the weight or guiding column 1 and delivering at the moment of impact of the hammer 5 on the target element 4 a marker-signal defining an initial reference instant on the recordings of signals generated by geophones in response to echoes of the transmitted acoustic impulses over underground beds.

According to the requisite acoustic capacity, the size of the weight or hammer 5 and its drop height can be varied and, for example, the weight may be a range of between 5 kg and 40 kg and the drop height in a range of between 5 meters and 20 meters.

The device for generating acoustic impulses inside a well or drilling hole constructed in accordance with the present invention, operates in the following manner:

Having been lowered inside the well or drilling hole in appropriately centered, the guiding column 1 is then coupled with the wall of the well or drilling hole by inflating the blow-out preventer 2 from the surface installation with the aid of pressurized water. The weight or hammer 5 is in a lowered position in contact with the target element (FIG. 2). The winch 12 is then activated (FIG. 1) so as to unwind the traction cables 10 and lower the crown 7 along the guiding column 1 until the magnetic device 8, fixed to the crown 7, come to lie flat against the upper side of the hammer (FIG. 3). The winch is then activated in an opposite direction to hoist the crown 7 and the weight or hammer 5 which is then secured to it as far as the selected weighs position (FIG. 4). Finally, a demagnetization current is applied to the magnetic devices 8, and the weight or hammer 5 is released and, after a drop guided by the guiding column 1, the weight or hammer 5 strikes the target element 4 (FIG. 1) and generates acoustic impulses which are transmitted to the surrounding formations by the blow-out preventer 2.

As can readily be appreciated, it is also possible to replace the permanent magnetic devices 8 by electromagnets or any equivalent method intermittently ensuring that the hammer is maintained against the crown 7.

Likewise, the blow-out preventer 2 ensuring coupling of the target element to the wall of the well could be replaced by any element provided with coupling surfaces adapted to be intermittently applied against the wall of the well.

We claim:

1. Device for generating acoustic impulses inside a well or drilling hole for use in geophysical prospecting, the device comprising a coupling element including a variable volume enclosure means adapted to be expanded and applied against a side wall of the well or drilling hole, mass means, a target element fixed to an upper end part of the coupling element, means fixed to said coupling element for guiding the fall of the mass means along the well or drilling hole towards the target element, and a lifting means disposed outside the well or drilling hole for raising the mass means with respect to the target element whereby axial impacts of the mass means against the target element are transmitted to the earth through said enclosure means.

2. Device according to claim 1, wherein the means for guiding the fall of the mass means include a tubular column means, the pressurized water supply means being in communication with said enclosure means by said tubular column means.

3. Device according to claim 1, wherein the lifting means includes magnetic means secured to cables connected to a winch means, said magnetic means being capable of being intermittently bound up with said mass means.

4. Device according to claim 1, wherein means are provided for generating an electrical signal at a moment of impact of the mass means against the target element.

* * * * *